United States Patent
Wu et al.

(10) Patent No.: US 8,645,188 B2
(45) Date of Patent: Feb. 4, 2014

(54) AUTOMATIC DEMAND PARAMETER ESTIMATION

(75) Inventors: Su-Ming Wu, Waltham, MA (US); Yevgeniy Popkov, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 16 days.

(21) Appl. No.: 13/348,848

(22) Filed: Jan. 12, 2012

(65) Prior Publication Data

US 2013/0185117 A1      Jul. 18, 2013

(51) Int. Cl.
*G06Q 30/00*       (2012.01)

(52) U.S. Cl.
USPC ....................................................... 705/7.31

(58) Field of Classification Search
USPC ....................................................... 705/7.31
See application file for complete search history.

(56) References Cited

U.S. PATENT DOCUMENTS

| | | | | |
|---|---|---|---|---|
| 7,561,158 B2 * | 7/2009 | Abe et al. | ...................... | 345/440 |
| 8,065,203 B1 * | 11/2011 | Chien et al. | ...................... | 705/28 |
| 2011/0004510 A1 * | 1/2011 | Bateni et al. | .................... | 705/10 |

OTHER PUBLICATIONS

Sylvain Arlot, "A survey of cross-validation procedures for model selection", in Statistics Surveys vol. 4 (2010) 40-79.*

Mixing Qualitative and Quantitative Methods: Triangulation in ActionAuthor(s): Todd D. Jick in Administrative Science Quarterly, vol. 24, No. 4, Qualitative Methodology (Dec. 1979),pp. 602-611.*
Enhancing Discrete Choice Demand Modeling for Decision-Based Design Henk Jan Wassenaar, et al. Enhancing Discrete Choice Demand Modeling for Decision-Based Design in Proceedings of DETC'03 ASME 2003 Design Engineering Technical Conferences and Computers and Information in Engineering Conference Chicago, Illinois USA, Sep. 2-6, 2003.*
Estimation of Mixture Models Using Cross-Validation Optimization: Implications for Crop Yield Distribution Modeling Joshua D.Woodard, et al. Amer. J. Agr. Econ. 93(4): 968-982 2011.*
Cross-Validating Regression Models in Marketing Research Steckel, Joel H;Vanhonacker, Wilfried R Marketing Science (1986-1998); Fall 1993; 12, 4; p. 415 Marketing Science, vol. 12, No. 4. Fall 1993.*

* cited by examiner

*Primary Examiner* — Mark A Fleischer

(74) *Attorney, Agent, or Firm* — Miles & Stockbridge P.C.

(57) ABSTRACT

One embodiment is directed generally to a computer system, and in particular to a system for providing automatic estimating of demand parameters. According to certain embodiments, a computer readable medium has instructions stored thereon that, when executed by a processor, cause the processor to determine a reliable demand parameter for a level within a sales hierarchy. The instructions include estimating a demand parameter for a first pool. The estimating is based on blending and comparing with respect to an enlarged pool comprising the first pool as a subset of the enlarged pool to obtain an estimated demand parameter.

20 Claims, 4 Drawing Sheets

AUTOMATIC DEMAND PARAMETER ESTIMATION

FIELD

One embodiment is directed generally to a computer system, and in particular to a system for providing automatic estimation of demand parameters.

BACKGROUND INFORMATION

Economic analysis in retail science, and in similar endeavors such as wholesale science, can have many practical applications. For example, one area of study in retail science is the production of a forecast of sales units for merchandise to determine how many units of a particular piece of merchandise will sell in a particular time period.

The sales units of merchandise can be affected by many factors, such as seasonal factors. Seasonal factors can take into account things like temperature factors with respect to clothing sales, but also other scheduled events that trigger purchasing, such as the Christmas shopping season for items purchased as gifts or the start of classes at the end of summer for items purchased for school.

Other factors can include whether a discount has been applied to the merchandise during the time period and at what point in the life cycle of the merchandise the time period falls. These are not an exhaustive list of factors.

These and other factors can be combined together to create a model for demand. The model for demand can then be used to intelligently suggest or reasonably select from those factors that are within the control of the retailer (in the case of retail science) or the manufacturer/distributor (in the case of wholesale science).

The model for demand can include demand parameters which depend on demand variables. However, determining the relationship between demand parameters and demand variables may not be completely intuitive. In particular, while it may be valuable to pool many disparate units together to obtain a demand parameter based on the most possible data, such a pool may not be as precise as a pool constructed only of similar units.

Simply pooling similar units together can be imprecise and can lead to a lack of confidence with respect to whether the resulting demand parameter for a pool that does not have a sufficiently reliable demand parameter of its own has been reliably calculated. This approach may, therefore, be prone to error, and may require a relatively sophisticated user or a user with specific product intuition, thus limiting the user base of the software that calculates demand parameters.

Attempting to improve demand parameters conventionally requires very complex calculations, relying on simulation or search techniques. These techniques require large amounts of computational resources, making them impractical or at least very expensive for retail-science applications, since large retailers typically have a very large amount of historical data.

SUMMARY

A computer readable medium has instructions stored thereon that, when executed by a processor, cause the processor to determine a demand parameter for a level within a sales hierarchy. The instructions include obtaining a blending parameter. The instructions also include blending a first pool with an enlarged pool using the blending parameter. The instructions further include estimating a demand parameter for the first pool based on the blending. The first pool is a subset of the enlarged pool.

DETAILED DESCRIPTION

One embodiment is a computer system that provides automatic estimation for demand parameters, through blending of demand parameters, for example, blending of estimates from small pools with estimates obtained from enlarged pools that contain the small pools, as will be discussed below.

Figure 1:
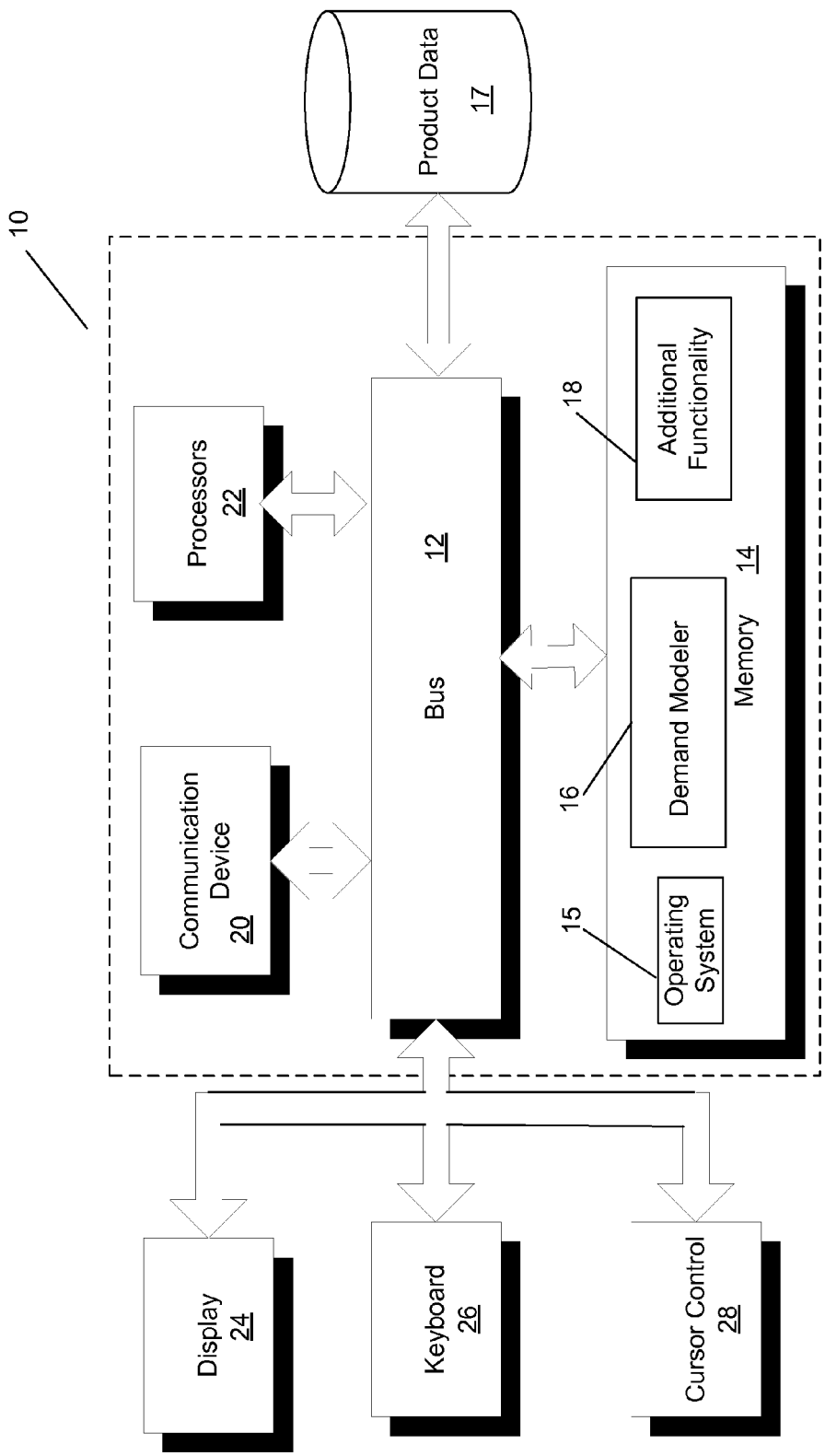
FIG. 1 illustrates a block diagram of a computer system that can implement certain embodiments.

FIG. 1 is a block diagram of a computer system 10 that can implement certain embodiments. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor capable of processing multiple instructions in parallel. In one embodiment, processor 22 is an individual multi-core processor, but may be implemented using multiple individual processors in communication with each other, or any other type of processor or processors that is capable of parallel computing. In alternative embodiments, processor 22 may be an individual single-core processor.

System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. A non-transitory computer readable medium, for example, can be employed as the memory 14. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), plasma display, or cathode ray tube ("CRT"), for displaying information to a user. A keyboard 26 and a cursor control device 28, such as a computer mouse, touch screen, or trackball device, is further coupled to bus 12 to enable a user to interface with system 10.

In one embodiment, memory 14 stores software modules that provide functionality when executed by processor 22. The modules include an operating system 15 that provides operating system functionality for system 10. The modules further include a demand modeler module 16 that models demand for goods and/or services, such as the goods of a retailer. Collectively, a hierarchy of goods, services, or both can be referred to as a sales hierarchy. Thus, the demand modeler module 16 can be used, for example, to forecast the sale of goods. System 10 can be part of a larger system. Therefore, system 10 can include one or more additional functional modules 18 to include the additional functionality, for example, models for obtaining specific demand parameters. Examples of additional functional modules 18 can include "Retail Demand Forecaster," "Markdown Optimizer," "Regular Price Optimizer," "Promotional Planning and Optimization," and "Size Profile Optimization" all from Oracle Corporation. A database 17 is coupled to bus 12 to provide centralized storage for modules 16 and 18. In certain embodiments, the database 17 may be a structured query language (SQL) or other relational database, and may store historical information regarding demand for various goods and services. Although one database 17 is shown, multiple databases may be included.

A causal demand model is one approach to forecasting sales units, although other demand models are also possible. For ease of explanation, the following discussion focuses on causal demand models, but it should be understood that the procedures and systems described do not have to be limited either to causal demand models or to the particular embodiments thereof, described below.

A causal demand model can be implemented in hardware or in the operation of software on hardware. A causal demand model can, for example, mathematically model sales units in various way. For example, a causal demand model can model sales units in terms of factors such as season, timing of discount within a period of selling of the merchandise, life cycle stage of the merchandise, etc.

These and other factors, which are known, believed, or thought to affect demand for the merchandise are termed "demand variables" for the demand model. The model can specify mathematically how the demand variables affect sales units. For example, if the amount of discount is a demand variable in the model, the model may specify that a 50% price cut results in a 4-fold increase in sales units, that is to say, sales quadruple. Thus, with a causal demand model, it may be possible to forecast sales units by specifying the future values of the demand variables.

To continue the price cut example, the retailer may plan to run a 40% sale during some weeks next season. The demand model can take this plan into account and forecast sales units for those weeks. Other possible sale percentages can also be used to forecast sales units during that time period. Assuming sale percentages have the effect of changing the expected demand, this information may help a retailer decide what sales percentage to select. The change in demand in response to a change in price is the item's price "elasticity," a reflection and measure of the relevant market's responsiveness to changes in price. Some models may treat price elasticity as linear, however, generally price elasticity curves can take various shapes and can be modeled accordingly.

The demand model can determine (or be supplied with) a shape for this price elasticity curve. The shape for this curve can be determined according to the relationship of the demand variables to the sales units. This relationship can be referred to, in the context of the demand model, as the demand parameter associated with the demand variable.

The demand parameters can be initially unknown, and the demand model can be configured to provide the demand parameters. By accurate determination of demand parameters, more accurate sales forecasts can be achieved.

In the example given above, a 50% price cut results in a 4-fold increase in sales units. This is not simply an arbitrary selection of a value. Instead, the relationship between the discount demand variable and sales units is determined though a method of calculation. In particular, the demand parameter can be determined by examining historical data containing price cuts for the merchandise itself. The determination process is called "estimation," and can involve estimation routines that examine the historical sales data and apply various statistical approaches.

Frequently, however, the merchandise itself has too little historical sales data for the routines to make a reliable estimate of the demand parameters. Moreover, there are mathematical and statistical reasons why estimation of demand parameters based only on a single item of merchandise can be impractical.

Thus, historical data of several items of merchandise can be pooled together, and an overall estimate of demand parameters can be made for all the items simultaneously. Thus, for example, the elasticity estimate represents a type of average elasticity over all of the several items of merchandise whose historical data has been pooled together. The items of merchandise are presumed to be similar, so that using an average elasticity over all of the items does not seriously misrepresent the elasticity of any particular item.

However, the more items that are pooled together, the less representative the estimated elasticity is of any particular item. Thus, there is a tradeoff between the reliability of the estimate, and the applicability of the estimate to any particular item. The applicability of the estimate to a particular item is known as "richness." Thus, this tradeoff is known as "richness vs. reliability." Pooling more items together increases reliability at the expense of richness, while pooling fewer items increases richness at the expense of reliability.

Certain embodiments provide a way of partially mitigating the richness vs. reliability tradeoff by offering improved reliability without as much of a sacrifice in richness as alternative approaches. Because richness is not sacrificed as much, the end result is improved forecasts of individual items.

Certain embodiments may have broad applicability. Although this description is provided with reference to forecasting sales as an example, the technique described is more generally applicable. Demand models can be used in many situations, not just to make sales forecasts, and models similar to demand models can be used in other areas besides retail science. The technique of certain embodiments applies to these other uses, for example, to any use that involves pooling of data into larger and smaller pools.

In one embodiment, the pooling of items is done in a structured and fixed way, using a hierarchy of "pools," each pool containing the smaller pools below it in the hierarchy. This may be a sales hierarchy. Thus, for example, the bottom of the hierarchy may contain pools with only a few items in it, while at the top of the hierarchy is one giant pool containing all of the merchandise sold by the retailer at any of its stores. In between are intermediate pools such as department-level pools, which contain all of the items in a specific department of the retailer. The hierarchy of pools can be specific to each retailer, and can serve as an organizational principle of the retailer's business. The "level" of a pool is the level of the pool within this hierarchy (for example "department level"). Each level of the hierarchy contains multiple pools. For example, the Department level has one pool for each Department. Similarly, the Sub-class level would have one pool for each sub-class. The pools can also be referred to as partitions.

In one embodiment, a lowest level of pools in the hierarchy is the stock keeping unit ("SKU") level. The SKU level can have a vast number of partitions, with each partition being a single item. The next level can be, for example, a color level. The color level can have numerous partitions with each partition including a pool of SKUs. The style level can be above the color level. Above that can be a sub-class level, such as "men's belts." Then, above that level, there can be a class level, like "men's goods." The levels can continue with a department level followed by a division level. The demand parameters can be calculated at each level.

Other structured and fixed hierarchies are also possible. For example, a geographical hierarchy of zip code, city, county, state, country, and continent can be used to organize points of sale. Thus, the particular hierarchy used as an example in this discussion should not be considered the only possible hierarchy.

The more items that are pooled together, the less representative the estimated elasticity is likely to be of any particular item. Thus, in an ideal case, estimates are produced by performing them within each of the smallest, lowest-level pools. Accordingly, each pool receives its own estimate unaffected by the other pools.

Many of the lowest-level pools, however, may also have too few items or too little historical data to make a reliable estimate of demand parameters that is specific to the pool. Nonetheless, the items in such a pool may need forecasts, and hence may need demand parameters.

Certain embodiments use a blending of estimates from small pools with estimates obtained from enlarged pools that contain the small pools. Thus, for example, an estimate of elasticity from the pool of Men's Dress Belts, which may contain 10 separate belt SKUs, can be combined with an estimate of elasticity from the pool of Men's Belts, which may contain 80 belt SKUs (including the 10 from Men's Dress Belts). The small pool has high richness but low reliability, while the larger pool has lower richness but higher reliability. Blending the estimates from the two different pools is a way to approach an ideal combination of richness and reliability. The resulting blended estimate can be taken as an estimate for the smaller pool, Men's Dress Belts. Thus, certain embodiments obtain improved estimates for the smaller pool by blending the original small-pool estimate with a larger pool's estimate. The smaller pools are referred to as "lower level" while the enlarged pools containing them are referred to as "higher level."

Figure 2:
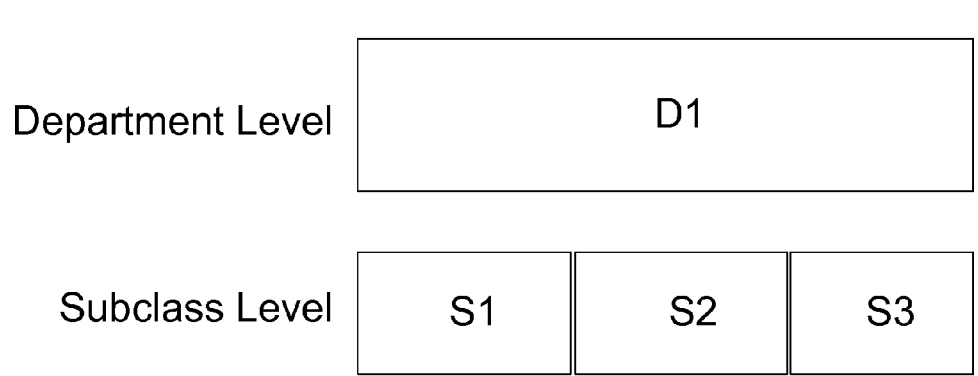
FIG. 2 illustrates a relationship between higher and lower levels.

In a specific example, "sub-class" is the lower level, which may have a variety of pools, and "department" is the higher level, which may also have a variety of pools, each of which is made up of sub-class level pools. FIG. 2 illustrates a relationship between higher and lower levels. FIG. 2 particularly indicates how department level pool D1 consists of 3 sub-class pools, S1, S2, and S3 that together make up the D1 pool.

Demand parameters may be determined for each sub-class pool and for the department pool. This determination of the demand parameter is an estimate that is to be used to help predict such things as price elasticity of the pool. An initial estimate can be formed based on each pool itself. This estimate, however, can be improved. The estimate for S1 can be improved by blending together the estimate for D1. Likewise, estimates for S2 and S3 can be improved in a similar fashion. The method of improvement can be based on "two-fold cross validation." Two-fold cross validation involves splitting a pool into two parts, and calculating demand parameters for each part separately. Within the hierarchy illustrated in FIG. 2, D1 can be the parent or ancestor pool and S1, S2, S3 can be the children or descendent pools. The descendents in certain embodiments may all be at the same level. For example, S1, S2, and S3 are all at the sub-class level. In other embodiments, descendents may not be all at the same level.

Figure 3:
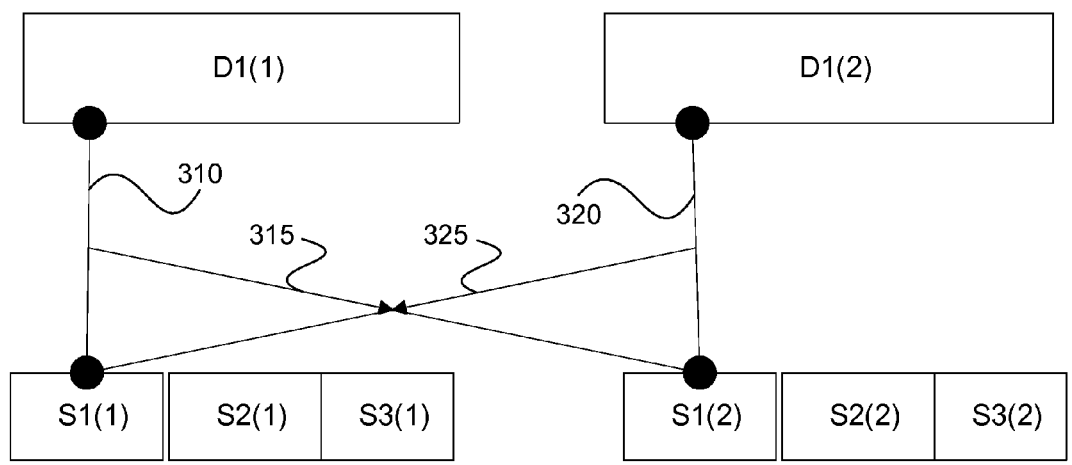
FIG. 3 illustrates two-fold cross validation according to certain embodiments.

FIG. 3 illustrates two-fold cross validation according to certain embodiments. In particular, FIG. 3 shows a two-fold cross validation on D1 with respect to its subclass S1.

In FIG. 3, the pools at the lower level (subclass) are randomly split into two equally-sized pools. S1 is split into S1(1) and S1(2). S2 and S3 can be handled the same way. Department D1 is also split into two pools (also called "split pools" because they are the result of splitting a pool) D1(1) and D1(2). This split is not performed independently. Instead, the split of department D1 is determined from the subclass split, with D1(1) being the union of S1(1), S2(1), and S3(1) and D1(2) being the union of S1(2), S2(2), and S3(2).

One purpose of splitting the pools is to provide independent split pools, each of which may have an estimable demand parameter, just as the original pools had a demand parameter that could be estimated. The split pools, each having a sub-set of the original pools, may have a different estimated demand parameter from the original pools. These different demand parameters can be useful in arriving at a blending variable/parameter for blending the demand parameters of the original pools, as will be discussed below.

After splitting, the demand parameters are, in the example of FIG. 3, calculated for D1(1), D1(2), S1(1), and S1(2). "Cross comparison" is then used to blend together the demand parameters for D1(1) and S1(1). This "blended" demand parameter is compared with the estimate for S1(2). The same blending and comparison is also applied to D1(2) blended with S1(2) and compared with S1(1). The vertical lines denote the blending, and the lines with arrows denote the comparison. Thus, line 310 denotes the blending of D1(1) and S1(1) and line 320 denotes the blending of D1(2) and S1(2). Likewise, line 315 indicates the comparison of the blended D1(1) and S1(1) with S1(2) and line 325 indicates the comparison of the blended D1(2) and S1(2).

In one embodiment, the blend is performed in terms of a blending variable "B", whose value starts out as unknown. There is a single B shared jointly by both of the blend-and-compares. The range of B in one embodiment is $0 \leq B \leq 1$. The formula for expressing this blend-and-compare in terms of B, called the comparison error ("CE"), is as follows:

$$CE = [\text{blended}(D(1),S(1),B) - \text{estimate}(S(2))]^2 + [\text{blended}(D(2),S(2),B) - \text{estimate}(S(1))]^2 \quad \text{(Equation 1)}$$

in which $$\text{blended}(D(1),S(1),B),B) = (1-B) \cdot \text{estimate}(S(1)) + B \cdot \text{estimate}(D(1)) \quad \text{(Equation 2)}$$

and similarly for blended(D(2), S(2), B). To simplify notation, here D=D1 and S=S1. In other words, rather than D1(1), Equation 2 simply states D(1) and instead of S1(1), Equation 2 simply states S(1). To minimize CE, one can search for a value of B that minimizes CE in Equation 1. Thus, for example, one can pursue a method of trial and error by trying multiple values of B and picking the one that yields the best result.

Each set of square brackets in Equation 1 corresponds to one vertical line and its associated arrow in FIG. 3. Thus for example, the first bracketed element refers to the blending indicated by line 310 and the subtraction indicated by line 315. Likewise, the second bracketed element refers to the blending indicated by line 320 and the subtraction indicated by line 325.

The B can be chosen to minimize the comparison error. This optimal B does not require a search, because the optimal B has a closed-form mathematical expression that yields its value. The expression is as follows:

$$B = \frac{(S(2)-S(1))\cdot(D(1)-S(1)) + (S(1)-S(2))\cdot(D(2)-S(2))}{(D(1)-S(1))^2 + (D(2)-S(2))^2}. \quad \text{(Equation 3)}$$

To simplify notation, in Equation 3 S(1) denotes estimate (S(1)) and similarly for S(2), D(1) and D(2). Once the value of B is obtained, it can be plugged back into the comparison error formula (Equation 1) to obtain the actual comparison error.

Once the value of B is obtained, estimates for the original pools D1 and S1 are obtained. The estimating can be done before or after obtaining the value of B. A new estimate for S1 can then be provided that consists of the estimates for D1 and S1 blended together by B. For example, if B is 0.75, then 0.75 times the estimate for S1 and (1-0.75) times the estimate for D1 are added together to obtain an improved estimate of S1.

Modifications of this scheme may be employed. For example, a separate B can be calculated for S1 and for each of the larger pools that contain S1. In the example above, only the one pool D1 that contains S1 was considered. In a hierarchical structure, however, there can be increasingly larger pools of increasingly higher levels, all containing S1. For example, above the department D1 might be a division-level pool. Thus, what is ultimately selected is the hierarchy level that gives the lowest comparative error. In other words, with each hierarchy level there is an associated comparative error and the system can select the hierarchy level that has the lowest comparative error.

Using size profiles as an example, a blended size profile value for size s can be as follows:

$$bsp_s^{child,ancestor}(\hat{\lambda}) = (1-\hat{\lambda})\cdot rsp_s^{child} + \hat{\lambda}\cdot rsp_s^{ancestor} \quad \text{(Equation 4)}$$

where bsp refers to blended size profile, rsp refers to raw size profile, and $\hat{\lambda}$ refers to blending weight (between zero and one). B and $\hat{\lambda}$ can refer to the same thing.

Blending weight value $\hat{\lambda}$ can be found by two-fold cross-validation by minimizing the following quadratic loss equation:

$$\min_{\hat{\lambda}} \sum_{sizes} \left( bsp1_s^{child,ancestor}(\hat{\lambda}) - rsp2_s^{child} \right)^2 \quad \text{(Equation 5)}$$

where bsp1 refers to the blended size profile estimated using the data from fold #1 of the two-fold cross validation and rsp2 refers to the raw size profile estimated using fold #2 of the two-fold cross validation.

By applying a first order condition with respect to $\hat{\lambda}$, it can be found that the loss function above has the following solution:

$$\hat{\lambda} = \frac{\sum_{sizes}(rsp2_s^{child} - rsp1_s^{child}) \cdot (rsp1_s^{ancestor} - rsp1_s^{child})}{\sum_{sizes}(rsp1_s^{ancestor} - rsp1_s^{child})^2}. \quad \text{(Equation 6)}$$

If $\hat{\lambda}$ is outside of [0,1] then $\hat{\lambda}$ can be set to the corresponding bound, since the loss function is convex. The blending can be performed for all child-ancestor level combinations. Then, in certain embodiments, for a given child node, the child-ancestor combination that has lowest quadratic error based on a hold-out sample can be chosen.

Figure 4:
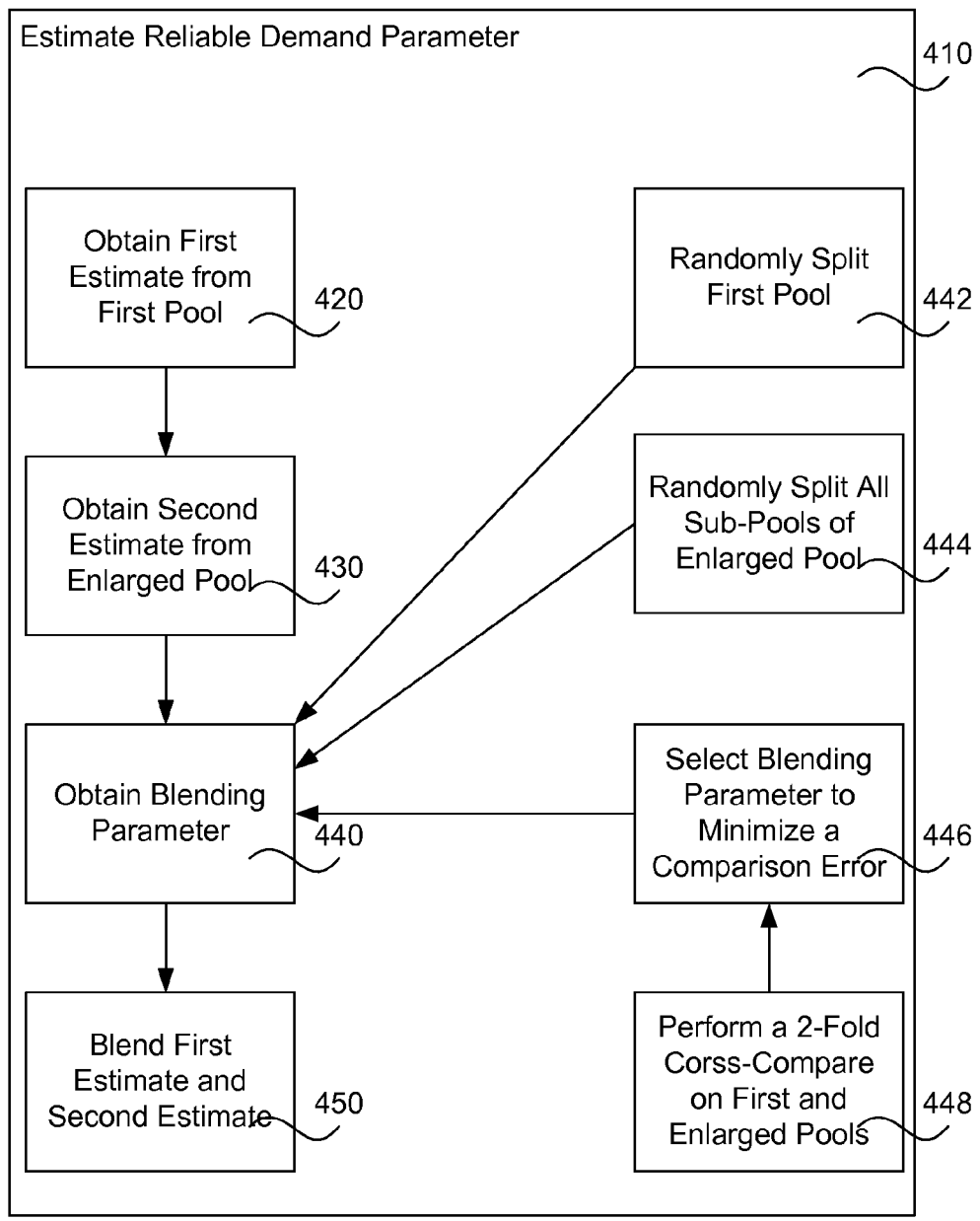
FIG. 4 is a flow diagram of the functionality of demand modeler module of FIG. 1 when determining an estimate of a demand parameter within a hierarchical set of pools of goods and/or services in accordance with one embodiment.

FIG. 4 illustrates a method according to certain embodiments. More specifically, FIG. 4 is a flow diagram of the functionality of demand modeler module 16 of FIG. 1 when determining a reliable demand parameter for a level within a sales hierarchy. In one embodiment, the functionality of the flow diagram of FIG. 4 is implemented by software stored in memory or other computer readable or tangible medium, and executed by a single processor or multiple processors in parallel. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

As shown in FIG. 4, the functionality includes, at 410, estimating a demand parameter for a first pool. The estimating can be based on blending and comparing with respect to an enlarged pool comprising the first pool as a subset of the enlarged pool to obtain an estimated demand parameter. For example, the first pool can be a sub-class level pool and the enlarged pool can be a department level pool.

At 420 a first estimate of a demand parameter can be obtained for the first pool. The first pool can be, for example, S1 in FIG. 2. The first estimate can be an estimate of the demand parameter of S1 itself. A maximum likelihood estimator can be employed to provide this estimate.

The estimating of the demand parameter can also include, at 430, obtaining a second estimate of a demand parameter for the enlarged pool. The enlarged pool can be, for example, D1 in FIG. 2. This estimate can take into account all of the contents of D1, i.e. S1, S2, and S3. This can performed by using a weighted average of lower level model parameters or by using a double ratio transformation with sufficient statistics.

At 440 a blending variable/parameter can be obtained. For example, Equation 3 above can be used to calculate B from the estimates of partitions (i.e. split pools) of the pool and the enlarged pool.

The obtaining the blending parameter can include, at 442, randomly splitting the first pool into a plurality of split pools. Thus, S1 from FIG. 2 can be split into S1(1) and S1(2) as shown in FIG. 3. This random split can be performed in any desired way.

At 444, all sub-pools of the enlarged pool having a same level as the first pool can be randomly split. Thus, S2 from FIG. 2 can be split into S2(1) and S2(2) as shown in FIG. 3 and S3 from FIG. 2 can be split into S3(1) and S3(2) as shown in FIG. 3. This random split can be performed in the same way as the random split for the first pool. These splits can result in two split enlarged pools, for example D1(1) and D1(2) in FIG. 3. D1(1) can be the union of S1(1), S2(1), and S3(1) and D1(2) can be the union of S1(2), S2(2), and S3(2).

The obtaining the blending parameter can further include, at 446, selecting a blending parameter that minimizes a comparison error with respect to the first pool and the enlarged pool. As an alternative to searching by trial and error or similar techniques utilizing Equations 1 and 2, Equation 3 can be used to identify a value of the blending parameter (B) that minimizes a comparison error (CE).

At 448, a two-fold cross validation can be performed on the first pool and the enlarged pool. Such a two-fold cross validation is illustrated in FIG. 3 and discussed above. More precisely, cross-validation is the way to obtain the blending parameter B. The closed-form expression (Equation 3) for B is a result of applying a two-fold cross validation technique.

The estimating the demand parameter can additionally include, at 450, blending the first estimate and the second estimate using the blending parameter, to obtain the estimated demand parameter. As discussed above, the blending parameter can be used as a weight to determine the influence of the first pool and the enlarged pool on the final estimate of the demand parameter.

A third pool can include the enlarged pool as a subset of the third pool. For example, a division level pool can include the department level pool. For example, a division level pool could include D1 of FIG. 2 but also other division level pools (D2, D3, etc. none of which are shown). The blending and comparing can be performed with respect to the first pool, the enlarged pool, and the third pool.

Thus, as disclosed above, a computer system can provide automatic estimation for demand parameters using comparing and blending. Certain embodiments, therefore, are applicable to any existing situation where demand parameters are already being calculated. If code is used to calculate demand parameters, it is not necessary to alter the code that calculates the demand parameters, as long as it can be called as a subroutine for the purposes of, for example, two-fold cross validation.

Although demand parameters used for forecasting are certain embodiments, the technique and systems described can apply to any calculation of demand parameters, whether used for forecasting or for some other purpose. In fact, models similar to demand models can be used in many areas other than retail science. Thus, certain embodiments can be used in a wide range of models that use pooling of data at multiple levels.

Certain embodiments can be implemented in a way that is mathematically uncomplicated. Thus, certain embodiments do not require complex code or third party libraries. Moreover, certain embodiments can be implemented in structured query language ("SQL") and can thus run directly in a database, such as a relational database, giving the technique performance and scalability.

Thus, according to certain embodiments, the blending variable/weight B (as shown in Equation 3, for example) can be determined in a rigorous and completely automated manner, requiring no user intervention. Moreover, the formula for B is simple enough to make its calculation straightforward in a database using SQL, thus enhancing performance and ease of programming.

Certain embodiments have the advantage of generality, as noted above. Moreover, as an aspect of this generality certain embodiments can be implemented on top of code that already performs estimation. That is, it may not be necessary to rewrite or re-implement the existing estimation code, since certain embodiments involve blending existing estimates. The certain embodiments can thus be implemented in any situation in which it is possible to simply call the existing estimation code as a subroutine. Thus, benefits of certain embodiments can be obtained without significant re-working or rewriting of existing code.

Thus, certain embodiments provide a simple, automated, and highly scalable, SQL-friendly approach to determining the optimal demand parameter estimate and, as a result, significantly improve predictive power of demand models. Such embodiments can apply, for example, to any product that calculates demand parameters and uses hierarchical pooling of data. Moreover, embodiments can be used in a variety of applications beyond retail, since models similar to the demand models of retail science can be used in many areas outside of retail.

While the embodiments disclosed above apply a relatively simple technique, other techniques may also be used. For example, additional techniques can be combined with the techniques set forth above.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to determine a demand parameter for a level within a sales hierarchy having a plurality of pools, the determining comprising:
    estimating a first demand parameter for a first pool and a second demand parameter for an enlarged pool, wherein the first pool and the enlarged pool are pools within the sales hierarchy, and the first pool is on the level and is a descendent of the enlarged pool;
    obtaining a blending parameter (B);
    blending the estimated first demand parameter and the estimated second demand parameter using the blending parameter; and
    estimating an improved demand parameter for the first pool based on the blending.

2. The computer readable medium of claim 1, wherein the estimating the improved demand parameter for the first pool comprises the sum of the following:
    multiplying the estimated first demand parameter and B; and
    multiplying the second demand parameter and (1-B), wherein $0 \leq B \leq 1$.

3. The computer readable medium of claim 1, wherein the obtaining the blending parameter comprises randomly splitting the first pool into a plurality of split pools.

4. The computer readable medium of claim 1, wherein the obtaining the blending parameter comprises randomly splitting all sub-pools of the enlarged pool having a same level as the first pool.

5. The computer readable medium of claim 1, wherein the obtaining the blending parameter comprises selecting a blending parameter that minimizes a comparison error with respect to the first pool and the enlarged pool.

6. The computer readable medium of claim 1, wherein the obtaining the blending parameter comprises:
    splitting the first pool into two first sub-pools;
    splitting the enlarged pool into two enlarged sub-pools; and
    performing a two-fold cross validation between the two first sub-pools and the two enlarged sub-pools.

7. The computer readable medium of claim 6, wherein the blending parameter (B) comprises:

$$B = \frac{(S(2) - S(1)) \cdot (D(1) - S(1)) + (S(1) - S(2)) \cdot (D(2) - S(2))}{(D(1) - S(1))^2 + (D(2) - S(2))^2};$$

wherein S(1) and S(2) are estimates for the two first sub-pools, and D(1) and D(2) are estimates for the two enlarged sub-pools.

8. A computer implemented method to determine a demand parameter for a level within a sales hierarchy having a plurality of pools, the method comprising:
    estimating at a processor a first demand parameter for a first pool and a second demand parameter for an enlarged pool, wherein the first pool and the enlarged pool are pools within the sales hierarchy, and the first pool is on the level and is a descendent of the enlarged pool;

obtaining a blending parameter (B);

blending the estimated first demand parameter and the estimated second demand parameter using the blending parameter; and estimating at the processor an improved demand parameter for the first pool based on the blending.

9. The computer implemented method of claim 8, wherein the estimating the improved demand parameter the first pool demand parameter comprises summing the following:

multiplying the estimated first demand parameter and B; and multiplying the second demand parameter and (1-B), wherein 0≤B≤1.

10. The computer implemented method of claim 8, wherein the obtaining the blending parameter comprises randomly splitting the first pool into a plurality of split pools.

11. The computer implemented method of claim 8, wherein the obtaining the blending parameter comprises randomly splitting all sub-pools of the enlarged pool having a same level as the first pool.

12. The computer implemented method of claim 8, wherein the obtaining the blending parameter comprises selecting a blending parameter that minimizes a comparison error with respect to the first pool and the enlarged pool.

13. The computer implemented method of claim 8, wherein the obtaining the blending parameter comprises:

splitting the first pool into two first sub-pools;
splitting the enlarged pool into two enlarged sub-pools; and
performing a two-fold cross validation between the two first sub-pools and the two enlarged sub-pools.

14. The computer implemented method of claim 8, wherein the blending parameter (B) comprises:

$$B = \frac{(S(2) - S(1)) \cdot (D(1) - S(1)) + (S(1) - S(2)) \cdot (D(2) - S(2))}{(D(1) - S(1))^2 + (D(2) - S(2))^2};$$

wherein S(1) and S(2) are estimates for the two first sub-pools, and D(1) and D(2) are estimates for the two enlarged sub-pools.

15. A demand modeler system, comprising:

a processor; and a computer readable medium coupled to the processor;

wherein the processor, when executing instructions stored on the medium, determines a demand parameter for a level within a sales hierarchy having a plurality of pools, the demand parameter determination comprising:

estimating a first demand parameter for a first pool and a second demand parameter for an enlarged pool, wherein the first pool and the enlarged pool are pools within the sales hierarchy, and the first pool is on the level and is a descendent of the enlarged pool;

obtaining a blending parameter(B);

blending the estimated first demand parameter and the estimated second demand parameter using the blending parameter; and estimating an improved demand parameter for the first pool based on the blending.

16. The demand modeler system of claim 15, wherein the estimating the improved demand parameter for the first pool comprises the sum of the following:

multiplying the estimated first demand parameter and B; and multiplying the second demand parameter and (1-B), wherein 0≤B≤1.

17. The demand modeler system of claim 15, wherein the obtaining the blending parameter comprises randomly splitting the first pool into a plurality of split pools.

18. The demand modeler system of claim 15, wherein the obtaining the blending parameter comprises randomly splitting all sub-pools of the enlarged pool having a same level as the first pool.

19. The demand modeler system of claim 15, wherein the obtaining the blending parameter comprises selecting a blending parameter that minimizes a comparison error with respect to the first pool and the enlarged pool.

20. The demand modeler system of claim 15, wherein the obtaining the blending parameter comprises:

splitting the first pool into two first sub-pools;
splitting the enlarged pool into two enlarged sub-pools;
performing a two-fold cross validation between the two first sub-pools and the two enlarged sub-pools.

* * * * *

UNITED STATES PATENT AND TRADEMARK OFFICE
CERTIFICATE OF CORRECTION

| | | |
|---|---|---|
| PATENT NO. | : 8,645,188 B2 | Page 1 of 1 |
| APPLICATION NO. | : 13/348848 | |
| DATED | : February 4, 2014 | |
| INVENTOR(S) | : Wu et al. | |

It is certified that error appears in the above-identified patent and that said Letters Patent is hereby corrected as shown below:

On title page, column 2, under Other Publications, line 2, delete "ActionAuthor(s)" and insert
-- Action Author(s) --, therefor.

In the Drawings

On Sheet 4 of 4, in figure 4, under Reference Numeral 448, line 2, delete "Corss-Compare" and insert
-- Cross-Compare --, therefor.

In the Specification

In column 6, line 27, delete ""Cross comparison"" and insert -- "Cross-comparison" --, therefor.

Signed and Sealed this
Tenth Day of June, 2014

Michelle K. Lee
*Deputy Director of the United States Patent and Trademark Office*